United States Patent
Follstaedt et al.

[15] 3,683,989
[45] Aug. 15, 1972

[54] PREVAILING TORQUE LOCKNUT

[72] Inventors: Donald W. Follstaedt, Middletown, Ohio; Richard D. Pinson, Independence, Mo.

[73] Assignee: Armco Steel Corporation, Middletown, Ohio

[22] Filed: March 23, 1970

[21] Appl. No.: 21,626

[52] U.S. Cl. ............................................. 151/21 B
[51] Int. Cl. ............................................. F16b 39/30
[58] Field of Search ...... 151/21 B; 10/86 A; 151/21 B

[56] References Cited

UNITED STATES PATENTS

| | | | |
|---|---|---|---|
| 2,754,871 | 7/1956 | Stoll | 151/21 B |
| 3,311,147 | 3/1967 | Walker | 151/21 B |
| 3,456,704 | 7/1969 | Johnson | 151/21 B |
| 3,431,959 | 3/1969 | Boebe et al. | 151/21 B |
| 3,457,979 | 7/1969 | Monro | 151/21 B |

FOREIGN PATENTS OR APPLICATIONS

| | | | |
|---|---|---|---|
| 823,644 | 11/1959 | Great Britain | 151/21 B |

*Primary Examiner*—Edward C. Allen
*Attorney*—Melville, Strasser, Foster & Hoffman

[57] ABSTRACT

A prevailing torque locknut comprising a polygonal body having base and top ends, a central threaded bore extending from the base end to the top end, at least six longitudinal side walls arranged about the threaded bore, the body having a locking zone longitudinally spaced from the base and top ends sufficiently to provide a plurality of thread turns of normal configuration for free-running initial engagement with a threaded bolt, the locking zone being formed by a single transversely arcuate punched indentation in each of a plurality of alternate side walls of the body, each indentation being of a longitudinal length greater than the pitch of the thread and being of a depth sufficient to displace the thread crests and roots radially inward of the original thread diameter in the area of the thread bore normal to the indentation, the displaced thread roots having a curved configuration in longitudinal section, the displaced thread crests at each side of the displaced, curved threaded roots being longitudinally displaced a distance greater than the original pitch of the thread. The radially inner threads normal to the unindented intervening side walls are displaced radially outward of the original thread diameter when the locknut is deformed by the indentations.

6 Claims, 6 Drawing Figures

PATENTED AUG 15 1972 3,683,989
SHEET 1 OF 2
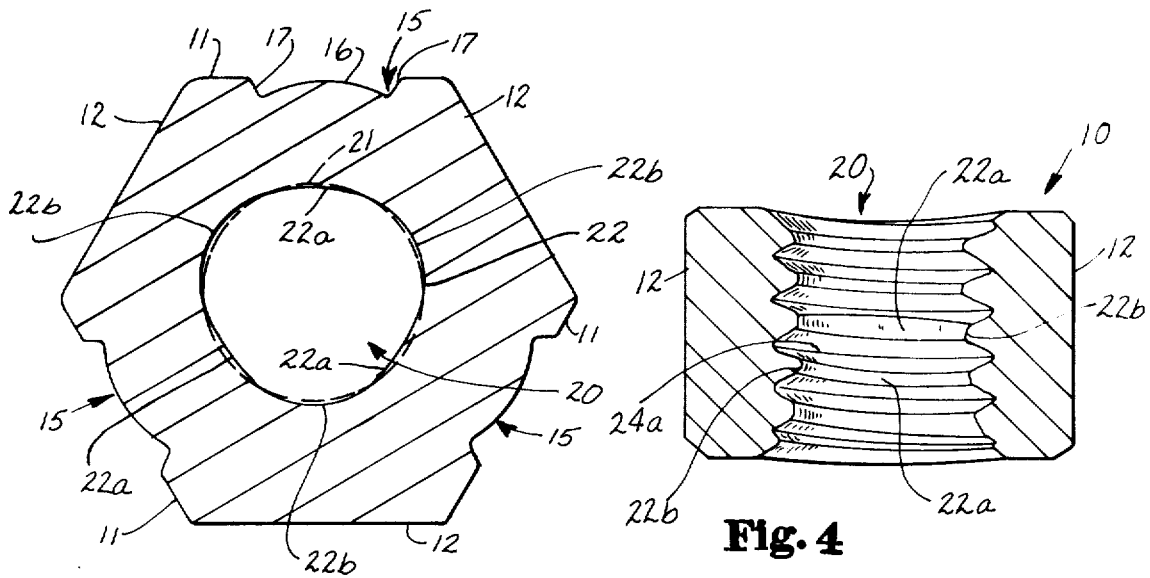
Fig. 2
Fig. 4
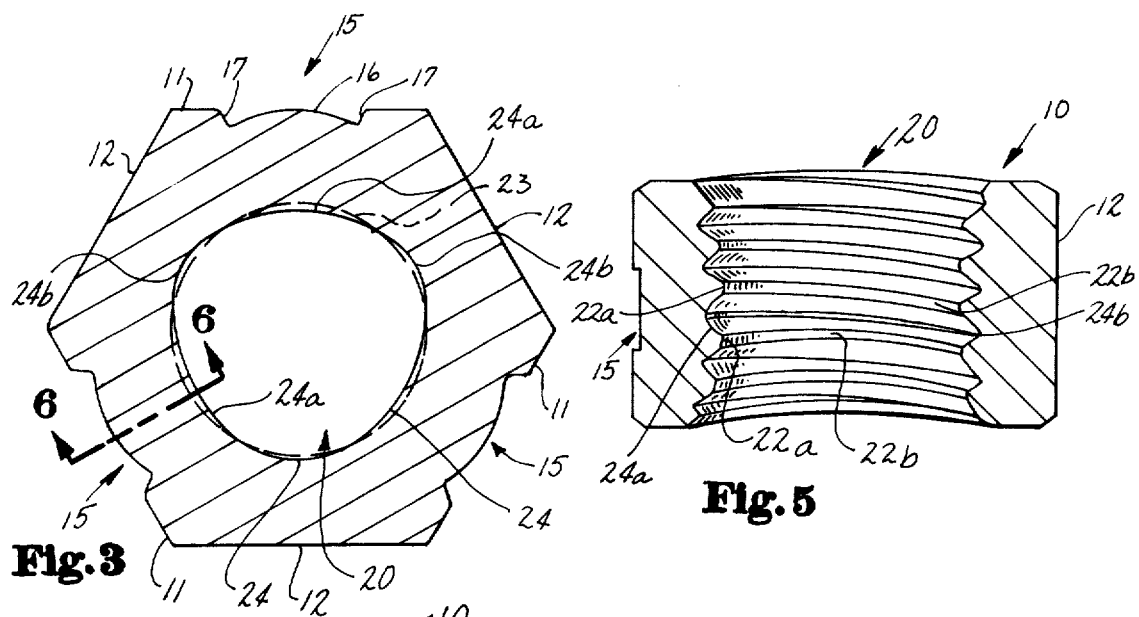
Fig. 3
Fig. 5
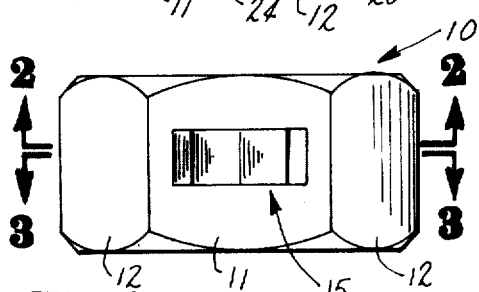
Fig. 1
INVENTORS
Donald W. Follstedt
and
Richard D. Pinson
BY Melville, Strasser, Foster and Hoffman
ATTORNEYS

PREVAILING TORQUE LOCKNUT

BACKGROUND OF THE INVENTION

Field of the Invention

This invention relates to directional or non-directional prevailing torque locknuts which may have hexagonal nut bodies, although the invention is not so limited, with a locking zone in the central threaded bore normal to a plurality of alternate indented side walls of the nut body.

The principal problems in the design of locknuts are the attainment of low application torque, high breakaway torque, minimum galling action on the mating bolt, controllability of locking action, and the ability to maintain prevailing torque after repeated assembly and disassembly. This combination of properties results in an ability to withstand vibration and loosening torque.

SUMMARY OF THE INVENTION

It is a principal object of the present invention to provide a prevailing torque locknut having all the desired characteristics hereinabove set forth, resulting in higher resistance to vibration and loosening torque than locknuts of the prior art.

In the locknut of the present invention the locking zone provides three different types of thread deformation, viz: longitudinal (axial) displacement of at least two thread crests; radially inward displacement of both the thread crests and thread roots (i.e., the minor and major diameters); and formation of a curvilinear configuration of at least one thread root, instead of its original V-shape, in longitudinal cross-section, between two axially displaced thread crests.

The above described locking zone results in an increased area for a smooth interference fit between the nut threads and the threads of the mating bolt, with surface contact rather than mere point contact therebetween. Moreover, the approach to each interference fit is gradual. The novel locknut of this invention thus provides low installation torque, high breakaway torque, minimum galling effect on the mating bolt, controllability of locking action, and gradual decrease of prevailing torque after repeated applications.

According to the invention the above object and advantages are attained in a prevailing torque locknut comprising a polygonal body having base and top ends, a central threaded bore extending from the base end to the top end, at least six longitudinal side walls arranged about the threaded bore, the body having a locking zone longitudinally spaced from the base and top ends sufficiently to provide a plurality of thread turns of normal configuration for free-running initial engagement with a threaded bolt, the locking zone being formed by a single transversely arcuate punched indentation in each of a plurality of alternate side walls of the body, each indentation being of a longitudinal length greater than the pitch of the thread and being of a depth sufficient to displace at least two thread crests and at least one thread root radially inward of the original thread diameter in the area of the thread bore normal to the indentation, the displaced thread root having a curved configuration in longitudinal section, the displaced thread crests at each side of the displaced, curved thread root being longitudinally displaced a distance greater than the original pitch of the thread, the radially inner threads normal to the other unindented intervening side walls being displaced radially outward of the original thread diameter by the indentations.

In a preferred embodiment, a non-directional hexagonal locknut according to the invention has a single transversely arcuate indentation in each of three alternate side walls, the three intervening side walls being unindented, each indentation having a longitudinal length from one to three times the pitch of the thread. The arcuate portion of each indentation is substantially concentric with the axis of the threaded bore, and each end of the arcuate portion merges smoothly into an upward, outwardly inclined face. In the locking zone both the major and minor diameters of the nut body are slightly triangulated; in an exemplary hexagonal locknut the displacement in the areas of the bore normal to the indentations is radially inward of the original radius, while the radius in the areas normal to the unindented side walls is increased slightly.

When the indentations are punched, the side walls remain substantially planar, although the indented walls may become slightly concave, while the unindented side walls may become slightly convex.

BRIEF DESCRIPTION OF THE DRAWING

Reference is made to the accompanying drawings wherein:

FIG. 1 is a side plan view of a non-directional, prevailing torque hexagonal locknut embodying the present invention;

FIG. 2 is a transverse sectional view on the line 2—2 of FIG. 1 through a minor diameter of the locknut;

FIG. 3 is a transverse sectional view taken on the line 3—3 of FIG. 1 on a major diameter of the locknut;

FIG. 4 is a longitudinal sectional view through the center of a locknut on a plane parallel to an indented side wall;

FIG. 5 is a longitudinal sectional view through the center of a locknut on a plane normal to an indented side wall.

DESCRIPTION OF THE PREFERRED EMBODIMENTS

Figure 6:
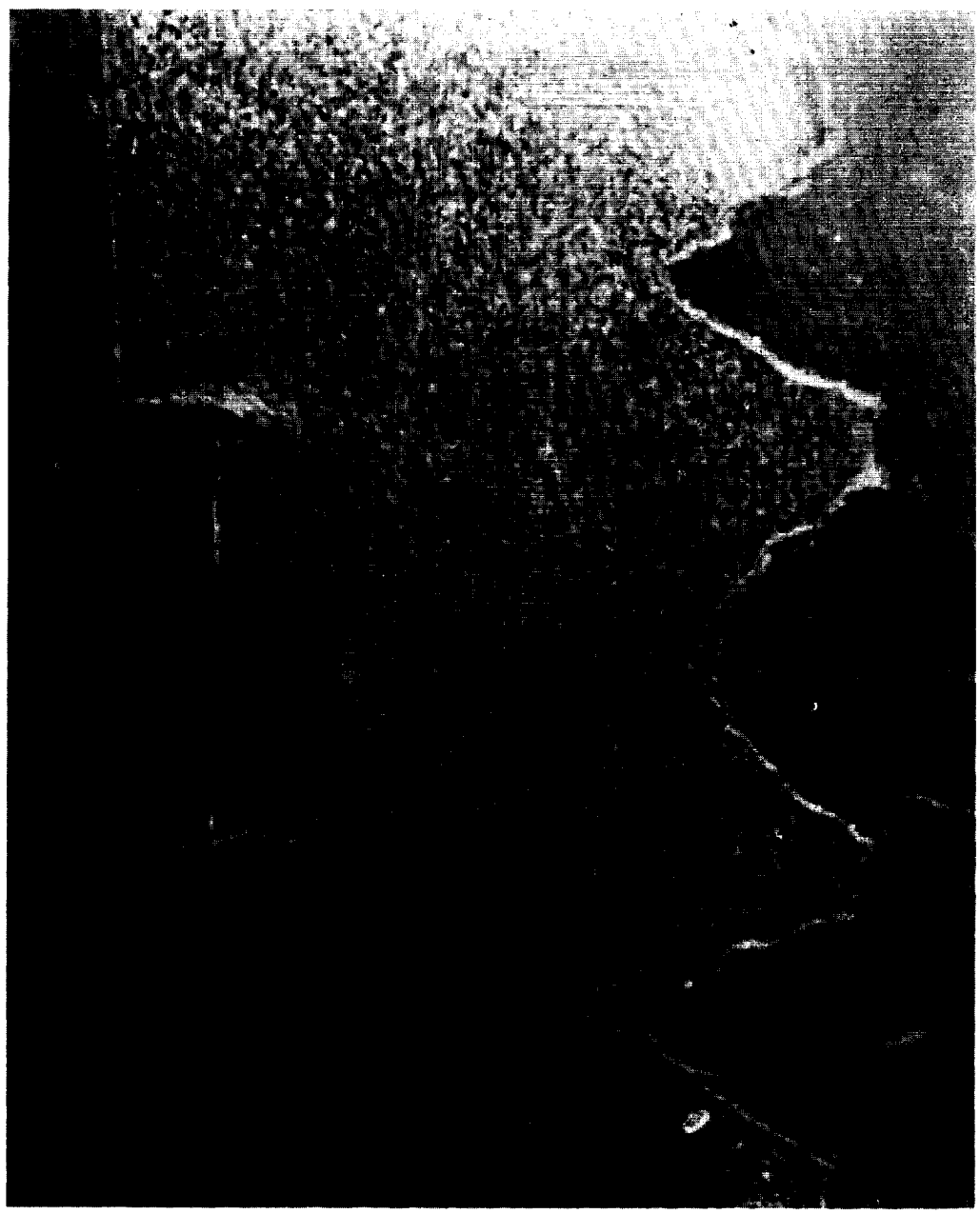
FIG. 6 is a photomicrograph at 25X of a portion of a longitudinal section of an indented side wall on a plane normal thereto taken on the line 6—6 of FIG. 3.

Reference is made to FIGS. 1–3 of the drawings which illustrate a non-directional locknut according to the present invention. The nut body is indicated generally at 10 having three alternate indented side walls 11 with intervening unindented side walls 12. Each indentation is shown generally at 15 and comprises a transversely arcuate portion 16 substantially concentric with the axis of the threaded bore, indicated generally at 20, the arcuate portion merging smoothly with upward, outwardly inclined faces 17.

FIG. 2 indicates in an exaggerated manner for purposes of illustration the triangulation of the minor diameter of the threaded bore 20 in the locking zone. The original minor diameter of the bore (before the indentations are punched) is shown in broken lines at 21 in FIG. 2. The minor diameter of the bore after indentations have been punched is indicated at 22 in FIG. 2. It will be noted that in the areas of the bore normal to the indentations, the minor diameter (or thread crest)

22 has been displaced radially inwardly, while in the areas normal to the unindented side walls the minor diameter is displaced radially outwardly. The radially inward displacement, indicated at 22a in FIG. 2, is greater than the radially outward displacement, indicated at 22b in FIG. 2.

FIG. 3 illustrates the triangulation of a major diameter of the threaded bore in a manner similar to that of the minor diameter of FIG. 2. The major diameter before indentations are punched is shown in broken lines at 23 in FIG. 3, while the major diameter after indentations have been punched is shown at 24. The radially inward displacement of the areas normal to the indented side walls is shown at 24a in FIG. 3, while the radially outward displacement of the areas normal to the unindented side walls is shown at 24b in FIG. 3. Here again the radially inward displacement at 24a is greater than the radially outward displacement at 24b.

Reference is next made to FIGS. 4 and 5 which illustrate the axial or longitudinal displacement of thread crests and the substantially parabolic curve configuration imparted to the thread root between the axially displaced thread crests in the area radially inward of an indented side wall. It will be noted that two thread crests 22a in FIG. 4 are each displaced axially or longitudinally away from a thread root 24a in the area radially inward of an indented side wall. On the other hand, the thread crests 22b in areas radially inward of unindented side walls maintain substantially their original pitch and same axial spacing relative to one another.

In FIG. 5, it will be noted that one thread root 24a has not only been displaced radially inwardly but has assumed a substantially parabolic curvilinear configuration, unlike its original V-shape. This occurs in the thread root between the axially displaced thread crests 22a. It will be noted further from FIG. 5 that the longitudinal length of the indentation 15 is substantially one and one-third times the thread pitch in a ½–13 U.N.C. (Unified National Coarse) locknut.

It will be understood that if a fine thread locknut is produced in accordance with this invention, there may be more than one thread root 24a displaced radially inwardly which assume the curvilinear configuration, and more than two thread crests 22a may be displaced axially.

It has been found that the change in pitch diameter in the locking zone should range between 0.009 inch and 0.016 inch in a ½-13 U. N. C. plain carbon steel locknut in order to produce torque values recommended by Industrial Fasteners Institute for Grade A locknuts. A deformation of less than 0.009 inch in pitch diameter results in insufficient locking action, while a deformation of greater than 0.016 inch causes formation of compression cracks around the nut walls.

Test data have also indicated that lower first installation maximum torque readings are obtained when at least one of the three indented side walls of a hexagonal nut is indented to a depth different from the others. The difference in depth of indentation may range from 30 to 100 percent. Moreover, lower first removal and higher fifth removal torques have been obtained with one indentation 0.004 inch deeper than the other two. This invention thus includes locknuts having indentations of non-uniform depth as well as indentations of uniform depth.

FIG. 6 illustrates the stress pattern created by a change in pitch diameter between 0.009 and 0.016 inch. It will be noted from the photomicrograph of FIG. 6 that in longitudinal section the stress is directed inwardly along converging lines from the top and bottom of the indentation, causing the V-shaped thread root to be deformed into a curvilinear configuration which is somewhat parabolic. This novel type of deformation of the thread root apparently results from the arcuate shape and longitudinal length of the indentation and is believed to contribute greatly to the improved performance of the locknuts of the present invention by reason of the smooth surface contact of the curved thread root of the nut with the thread crests of a mating bolt.

Tests were carried out on ½-inch cadmium plated carbon steel hex nuts of the present invention using a zinc phosphate and oil coated bolt of Grade 8 material. The test data are summarized in the Table below along with the IFI–100 specifications for locknuts.*(* Industrial Fasteners Institutes, 1505 East Ohio Building, 1717 East Ninth Street, Cleveland, Ohio 44114, IFI Standard 100 issued Jan. 10, 1967 and revised Mar. 31, 1969.

In the table below each test number represents an average of several test runs.

In Test Nos. 1 through 5 the pitch diameters of the test bolts ranged from 0.448 inch to 0.4485 inch, near the maximum tolerance range. In Test Nos. 6 and 7 the pitch diameters of the test bolts ranged from 0.444 inch to 0.4445 inch, near the minimum tolerance range.

In Test Nos. 6 and 7 each locknut was formed with two indentations the same depth and the third indentation 0.004 inch deeper.

It will thus be apparent that locknuts of the present invention meet the specifications of the Industrial Fasteners Institute and possess the desirable combination of properties hereinabove set forth.

TABLE

[½-13 U.N.C. plain carbon steel prevailing torques in inch-pounds]

| Test number | First Installation | | First removal | | Fifth removal | | Change in pitch diameter, inch |
|---|---|---|---|---|---|---|---|
| | Highest reading | Lowest reading | Highest reading | Lowest reading | Highest reading | Lowest reading | |
| 1 | 110 | 80 | 50 | 25 | 15 | 5 | .009-.011 |
| 2 | 140 | 120 | 70 | 60 | 25 | 10 | .011-.013 |
| 3 | 145 | 130 | 80 | 65 | 30 | 15 | .014-.016 |
| 4 | 220 | 150 | 115 | 90 | 65 | 40 | .017-.019 |
| 5** | 280 | 250 | 160 | 120 | 80 | 55 | .020-.024 |
| 6 | 135 | 120 | 60 | 50 | 30 | 20 | .011-.012 |
| 7 | 145 | 130 | 80 | 70 | 40 | 20 | .015-.016 |

IFI-100 (Grade A)150 max., 22 min., 10 min., 15 min., 7.5 min.
*80% of the nut samples had compression cracks around the nut wall.
**100% of the nut samples had compression cracks around the nut wall.

The locknuts of the invention may be of plain carbon steel or other metals, or may be provided with cadmium, electrogalvanized, or other coatings, including lubricants.

From the above description it will be apparent that there is thus provided a locknut of the character described possessing the particular features or advantages before enumerated as desirable, but which is susceptible of modification in its form, proportions and details of construction without departing from the principle involved or sacrificing any of its advantages. The invention is therefore claimed in any of its forms or modifications within the legitimate scope of the appended claims.

The embodiments of the invention in which an exclusive property or privilege is claimed are defined as follows:

1. A prevailing torque locknut comprising a polygonal body having base and top ends, a central threaded bore extending from the base end to the top end, at least six longitudinal side walls arranged about the threaded bore, and a locking zone in said bore longitudinally spaced at least from the base end sufficiently to provide a plurality of thread turns of normal configuration for free-running initial engagement with a threaded bolt, the locking zone being formed by a single transversely arcuate punched indentation in each of a plurality of alternate side walls of the body in an initially flat portion of said wall intermediate said base and top ends, the major portion of said indentation being an arcuate surface substantially concentric with the axis of said threaded bore, each indentation having a longitudinal length greater than the pitch of the thread and a transverse length less than the width of said side wall and being of a depth sufficient to displace at least two thread crests and at least one thread root radially inward of the original thread diameter in the area of the thread bore normal to the indentation, said displaced thread root and adjacent thread flanks having a substantially parabolic curvilinear configuration in longitudinal section, said displaced thread crests at each side of said displaced thread root being longitudinally displaced a distance greater than the original pitch of the thread, the thread crests and roots in the areas normal to the unindented intervening side walls being displaced radially outward of the original thread diameter.

2. The locknut claimed in claim 1, wherein each indentation has a longitudinal length of from one to three times the pitch of the thread, whereby at least two thread crests and at last one thread root therebetween are displaced radially inward of the original thread diameter in the area of the thread bore adjacent and normal to said indentation.

3. The locknut claimed in claim 2, wherein said thread crests and root in the area adjacent and normal to each indentation are displaced radially inward a distance substantially greater than the distance which said crests and roots in the area adjacent and normal to each unindented side wall are displaced radially outward.

4. The locknut claimed in claim 1, wherein each said arcuate portion merges smoothly at each end thereof with an upward, outwardly sloping surface.

5. The locknut claimed in claim 1, wherein the depth of indentation of at least one side wall differs from the depths of indentation of the others.

6. A prevailing torque hexagonal locknut comprising a polygonal body having base and top ends, a central threaded bore extending from the base end to the top end, six longitudinal side walls arranged about the threaded bore, and a locking zone in said bore longitudinally spaced at least from the base end a distance sufficient to provide a plurality of thread turns of normal configuration for free-running initial engagement with a threaded male member, the locking zone being formed by a single transversely arcuate punched indentation in each of three alternate side walls of said body in an initially flat portion of said wall intermediate said base and top ends, the major portion of said indentation being an arcuate surface substantially concentric with the axis of said threaded bore, each indentation having a longitudinal length from one to three times the pitch of the thread and a transverse length less than the width of said side wall and being of a depth sufficient to displace at least two thread crests and at least one thread root therebetween radially inward of the original thread diameter in the area of the thread bore normal to the indentation, said displaced thread root and adjacent thread flanks having a substantially parabolic curved configuration in longitudinal section, said displaced thread crests at each side of said displaced thread root being longitudinally displaced a distance greater than the original pitch of the thread, the thread crests and roots in the areas normal to the unindented intervening side walls being displaced radially outward of the original thread diameter.

* * * * *